F. M. SLATER.
FLUID CURRENT METER.
APPLICATION FILED SEPT. 27, 1917.
1,311,922.
Patented Aug. 5, 1919.
3 SHEETS—SHEET 1.
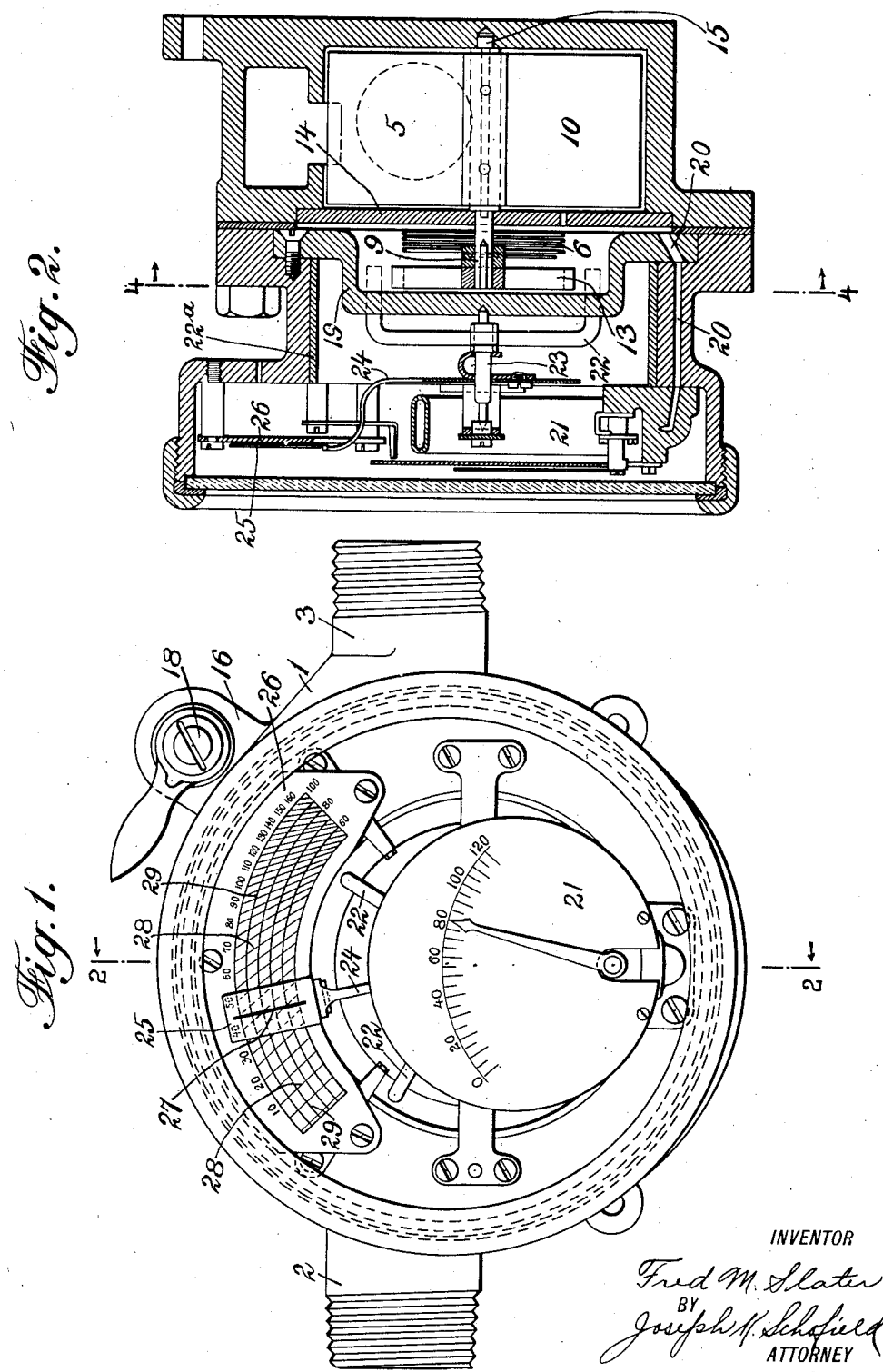
INVENTOR
Fred M. Slater
BY
Joseph N. Schofield
ATTORNEY

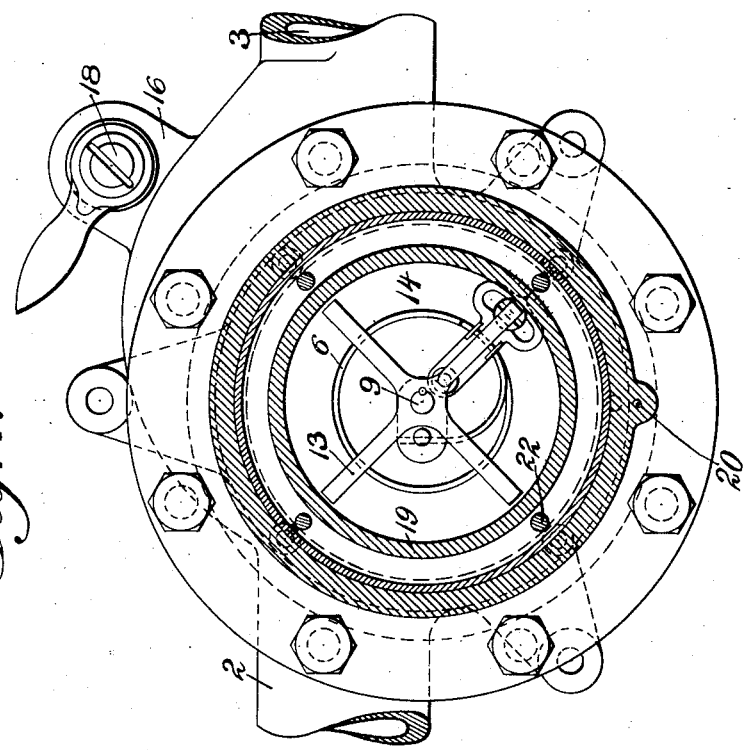
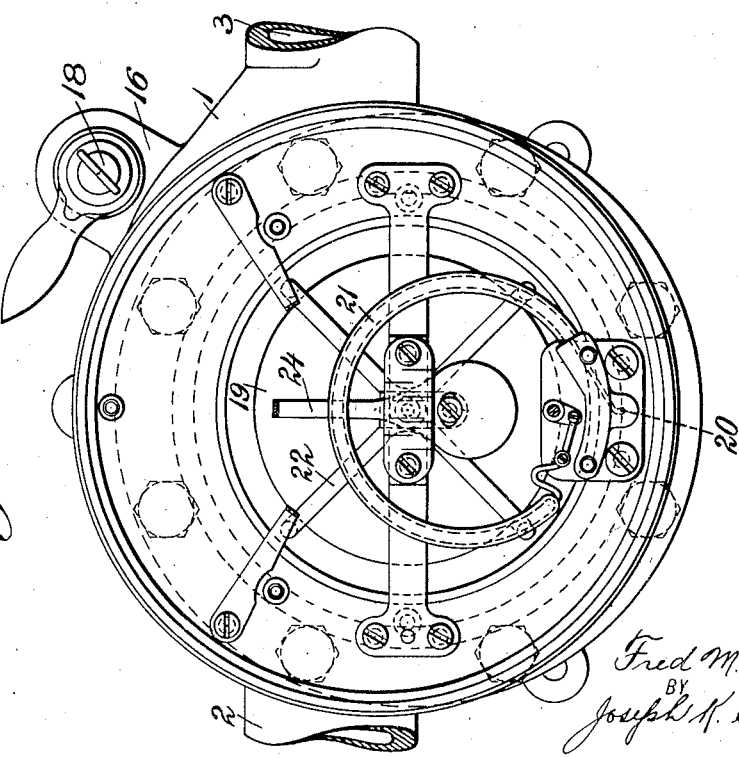

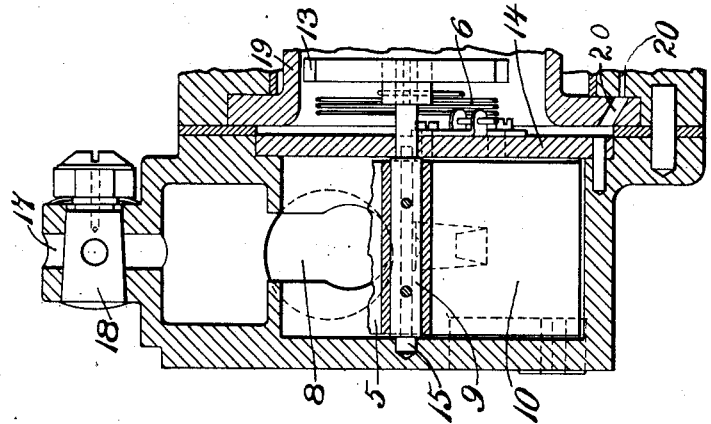
F. M. SLATER.
FLUID CURRENT METER.
APPLICATION FILED SEPT. 27, 1917.
1,311,922.
Patented Aug. 5, 1919.
3 SHEETS—SHEET 3.
INVENTOR
Fred M. Slater
BY
Joseph M. Schofield
ATTORNEY

UNITED STATES PATENT OFFICE.

FRED M. SLATER, OF EASTON, PENNSYLVANIA, ASSIGNOR TO INGERSOLL-RAND COMPANY, OF JERSEY CITY, NEW JERSEY, A CORPORATION OF NEW JERSEY.

FLUID-CURRENT METER.

1,311,922.  Specification of Letters Patent.  Patented Aug. 5, 1919.

Application filed September 27, 1917. Serial No. 193,498.

*To all whom it may concern:*

Be it known that I, FRED M. SLATER, a citizen of the United States, residing at Easton, in the county of Northampton and State of Pennsylvania, have invented a certain new and useful Improvement in Fluid-Current Meters, of which the following is a specification.

This invention relates to fluid current meters and more particularly to a meter for measuring the flow of a current of elastic fluid in which the pressure may be rapidly fluctuating.

The objects of my invention are to provide a new and improved form of fluid current meter in which the movement of a vane from a given position is proportional to the flow of the fluid being measured and the movement of the vane is indicated on a scale, the scale being of a new type in which the amount of fluid passing through the meter is directly indicated for different pressures within the limits of the meter.

In the drawings annexed hereto and forming a part of this present specification, Figure 1 is a top plan of my improved meter, Fig. 2, a cross sectional view on the line 2—2 of Fig. 1, Fig. 3, a plan view of the meter with the pressure gage plate and flow indicating scale removed, Fig. 4, a cross sectional plan view taken on the line 4—4 of Fig. 2, Fig. 5, a cross sectional view through the base of the meter, Fig. 6, a cross sectional view taken on the line 6—6 of Fig. 5, Fig. 7, a detail view of the pivot mounting of the pointer, and Fig. 8, a detail view of the magnetic follower.

Referring to the drawings, 1 shows the base of the meter having an inlet 2 and an outlet 3 at its respective ends separated by a chamber 4 forming the center of the base. In chamber 4 the periphery of which is preferably circular, a vane 5 is adapted to rotate against the action of a spring 6 within a portion of a circle limited by light buffer springs 7. Between the chamber 4 and outlet 3 is a variable measuring orifice or passage 8 which is opened more or less according to the degree of rotation imparted to the vane 5 by the force of the fluid impinging against it. It will be seen that the greater the current of fluid impinging against the vane 5 the greater distance the vane 5 will be rotated against the force of the spring 6. From this it will be seen that with the measuring orifice or passage 8 properly constructed the relative movements of the vane 5 may be utilized to indicate the amount of fluid passing through the meter within the limits for which the meter is designed. Preferably the vane is mounted to rotate about an axis or spindle 9 located centrally of the chamber 4 and is provided also with another vane 10 symmetrically mounted about the pivot 9 in order to balance the weight of the vane 5. Also contained in this chamber 4 is a diaphragm 11 comprising two plates 12 set into the walls of the base 1 and extending to the pivot 9. In addition to the vane 10 balancing the vane 5 it also acts to retard the movements of and to prevent violent fluctuation of the vane 5 for the reason that the vane 10 is made to fit fairly tightly to the sides of the chamber 4, and thus allows air to flow to the opposite sides of vane 10 very slowly as it is rotated about the pivot or spindle forming the axis 9.

Directly above the vane 5 and permanently attached to the pivot or spindle 9 so that it will have imparted to it all the movements of the vane 5 is a permanent magnet 13 which is preferably of cruciform shape. A plate 14 covers the chamber 4 and forms one of the bearings for the pivot 9, the other bearing for the pivot or spindle 9 being provided in the bottom of the base 1 as shown in Fig. 2, at 15.

Extending from the base 1 on the outlet side of the orifice 8 is a lug 16 provided with a hole 17 and also provided with a stop cock 18 by means of which the hole 17 may be conveniently opened and closed for a purpose to be explained later. A plate 19 completely and hermetically incloses the cavity or chamber 4. This plate may be offset in its central portions to accommodate the spring 6 and magnet 13. Obviously, this plate should be made of non-magnetic metal so that while the lines of magnetic force will pass through this plate they will be considerably damped.

From the above description it will be seen that the pressure of the fluid in chamber 4 is confined entirely to the portion of the meter in back of or below the cover plate 19 and that with the exception of a very small passage 20 through the forward part of the meter to supply fluid pressure to the pressure gage 21 no pressure above that of the atmosphere is present in the space above the diaphragm or plate 19. This is of great utility for the reason that many times water becomes entrapped in the fluid being measured and consequently fogs the glass covering usually provided by reason of the fact that the fine spray into which the water is transformed is able to come into direct contact with the under side of the glass plate.

Directly in line with the axis 9 about which the magnet 13 rotates as described above is another magnet 22 mounted about an axis or pivot post 23 to rotate in a plane parallel to that of the magnet 13. The arms of the magnets 13 and 22 it will be understood will be mutually attracted to each other so that as the magnet 13 is rotated the magnet 22 follows and takes up a new position dependent upon that of the magnet 13. While it would be sufficient if but one of the parts 13 or 22 were magnetized and the other made up of a soft iron and acted as an armature to the part energized as a magnet, it has been found that a stronger force of attraction acts to hold the parts 13 and 22 together if both parts are energized as magnets. To the pivot post 23 is secured a hand or pointer 24 which rotates with the pivot post 23 and magnet 22.

The magnet 22 which is preferably made of cruciform shape to correspond to the shape of the magnet 13 has a considerable moment of inertia and, as it is acted upon by a very slight magnetic force, does not vibrate or fluctuate widely with the vibrations of the magnet 13. Surrounding the cavity in which the magnet 22 operates is a soft iron member or band 22ª which is inserted for the purpose of freeing the magnets 13 and 22 from the influence of extraneous magnetic forces such as the earth's magnetic field.

Preferably, the pointer 24 terminates in a transparent section 25 having a heavy opaque line through its center which enables the position of the pointer to be accurately determined. However, this construction is not necessary as any other method of making up the pointer so that a set of indicating indicia may be applied to it would be included within the spirit of my invention. The end of the pointer 24 passes over a scale 26 placed just beneath the transparent section 25 and curved to conform to the path swept out by the pointer which carries another set of indicia. In my most approved form of scale the pointer merely carries a single indicating line 27 which indicates the position of the movable vane 5 and consequently the enlargement of the orifice 8. Upon the scale 26 are placed indicia 28 showing the number of cubic feet of free air passing through the meter at a given pressure when the pointer is located directly over that part of the scale. The scale 26 is also preferably provided with a series of arcuate indicating lines 29 so graduated that the cubic feet of free air at any given pressure passing through the meter may be read directly from the scale 26, for it is evident that the amount of fluid passing through the meter will vary with the pressure. This is accomplished in the following manner. The pressure of the fluid being measured is noted on the pressure gage 21 incorporated in the meter and the arc 29 corresponding to this pressure noted. Then the cubic feet of free air passing through the meter will be indicated by the line 28 passing through the intersection of the indicating line 27 on the pointer 24 and the arc 29 corresponding to the pressure of the fluid passing through the meter. For example, in the position of the pointer shown in Fig. 1, the reading of the meter would be as follows: The pressure gage being 80 pounds per square inch as shown by the pressure gage 21, the arc 29 corresponding to this pressure is used. Using this arc 29 we find that its intersection with the indicating line 27 on the pointer 24 intersects one of the lines 28 marked 40 cu. ft., which is the amount of fluid passing through the meter during a given unit of time with this position of the pointer 24, and pressure gage 21.

The provision of the stop cock 18 and orifice 17 enables the meter to be readily tested at any time. With the stop cock 18 turned to its open position an escape of constant size is provided for the fluid in the chamber 4 which obviously will permit only a certain definite amount of air to pass at any one given pressure. It is obvious therefore that with the stop cock 18 open the vane 5 and consequently the pointer 24 will stand at a certain position if there is no fluid passing through the meter to the line through the outlet 3 and the pressure is the same as when the meter was originally calibrated. If, therefore, at any time the meter is not thought to be indicating the flow of air or other fluid accurately, it is only necessary to close the outlet 3 by means of a valve, not shown, and open the stop cock 18, when, if the meter is in proper working order the pointer will stand over the same position occupied when the meter was originally calibrated and which is preferably indicated upon the scale 26 in any suitable manner (not shown).

It is to be understood that the present showing and description disclose only one specific embodiment of the present invention, and other forms and modifications are included within the spirit and scope thereof, as expressed in the appended claims.

What I claim is:

1. In a fluid current meter, a base, a chamber in said base, having a measuring orifice, a movable vane in said chamber adapted to enlarge and diminish said orifice, said chamber having an outlet to atmosphere, and means comprising a stop cock in said base opening and closing said outlet to atmosphere from a point beyond the above mentioned orifice whereby said measuring orifice may be enlarged to a definite degree for a given pressure.

2. In a fluid current meter, a base, a chamber in said base, a vane movable within said chamber, said chamber having a measuring orifice adapted to be enlarged or diminished by movement of said vane, said chamber also having a stop cock mounted in said base upon the discharge side of said vane adapted when in its open position to provide an orifice of definite size to atmosphere.

3. In a fluid current meter, a base, a chamber in said base, a vane movable within said chamber, said chamber having a measuring orifice adapted to be enlarged or diminished by movement of said vane, said chamber being further provided with a stop cock mounted in said base upon the discharge side of said vane adapted when in its open position to provide an orifice of definite size whereby said meter may be tested for a given amount of flow while the meter is in operative position.

4. In a fluid current meter provided with a measuring orifice, an indicator dial comprising a scale bearing indicia thereon and an indicator hand indicating the opening of said measuring orifice and bearing indicia adapted to register with said scale, the indicia bearing portion of said indicator hand being transparent whereby the indicia on the scale will be visible therethrough to indicate registry of the indicia on the scale with the indicia on the indicator hand, and means mounted in said meter to indicate what indicia on said scale is to be used.

5. In a fluid current meter provided with a measuring orifice, a scale calibrated to indicate varying volumes of free air at a predetermined pressure, pressure indicia also carried upon the scale, a hand passing over the scale indicating the size of said measuring orifice through the meter and pressure indicating means mounted in said meter whereby the amount of free air passing through the meter may be determined from the position of the pointer and the indicia upon the scale.

In testimony whereof I have hereunto set my hand.

FRED M. SLATER.